(12) United States Patent
Haynam et al.

(10) Patent No.: US 8,430,941 B2
(45) Date of Patent: Apr. 30, 2013

(54) FILTER ELEMENT ARRANGEMENT AND PORTABLE AIR CLEANER INCORPORATING SAME

(75) Inventors: Travis Haynam, Maineville, OH (US); Brad Zorb, Bellevue, KY (US); Dave Foust, Cincinnati, OH (US)

(73) Assignee: United Air Specialists, Inc., Cincinnati, OH (US)

( * ) Notice: Subject to any disclaimer, the term of this patent is extended or adjusted under 35 U.S.C. 154(b) by 395 days.

(21) Appl. No.: 12/741,398

(22) PCT Filed: Nov. 7, 2008

(86) PCT No.: PCT/US2008/082727
§ 371 (c)(1),
(2), (4) Date: May 5, 2010

(87) PCT Pub. No.: WO2009/061983
PCT Pub. Date: May 14, 2009

(65) Prior Publication Data
US 2010/0269461 A1    Oct. 28, 2010

Related U.S. Application Data

(60) Provisional application No. 60/986,744, filed on Nov. 9, 2007.

(51) Int. Cl.
*B01D 53/00*    (2006.01)

(52) U.S. Cl.
USPC ............. 55/432; 55/356; 55/366; 55/367; 55/368; 55/372; 55/373; 55/413; 55/467; 55/482; 15/320; 15/353; 15/DIG. 8

(58) Field of Classification Search ............ 55/432, 55/428, 522, 490, 429, 474
See application file for complete search history.

(56) References Cited

U.S. PATENT DOCUMENTS

| | | | |
|---|---|---|---|
| 2,409,078 A | 10/1946 | Swann | |
| 4,007,026 A | 2/1977 | Groh | |
| 4,204,846 A | 5/1980 | Brenholt | |
| 4,211,543 A | 7/1980 | Tokar et al. | |
| 4,304,580 A | 12/1981 | Gehl et al. | |
| 4,443,235 A * | 4/1984 | Brenholt et al. | ............. 96/408 |
| 4,629,482 A | 12/1986 | Davis | |
| 4,759,783 A | 7/1988 | Machado | |
| 4,765,811 A | 8/1988 | Beckon | |

(Continued)

FOREIGN PATENT DOCUMENTS

| CN | 1826163 A | 8/2006 |
|---|---|---|
| EP | 0329659 A1 | 8/1989 |

(Continued)

OTHER PUBLICATIONS

U.S. Appl. No. 12/741,230, filed May 5, 2010, Haynam et al.

*Primary Examiner* — Jason M Greene
*Assistant Examiner* — Dung H Bui
(74) *Attorney, Agent, or Firm* — Reinhart Boerner Van Deuren P.C.

(57) ABSTRACT

A portable dust collection air cleaner assembly is provided. A access hatch is hinged to a dust collection bin to provide ready access to the filter element. The filter element may include an outer annular flange carrying a gasket that rests upon, engagement and seals against a top panel of the dust collection bin.

20 Claims, 7 Drawing Sheets

U.S. PATENT DOCUMENTS

| | | |
|---|---|---|
| 5,145,496 A | 9/1992 | Mellen |
| 5,295,602 A | 3/1994 | Swanson |
| 6,036,757 A | 3/2000 | Gatchell et al. |
| 6,093,237 A | 7/2000 | Keller et al. |
| 6,235,194 B1 | 5/2001 | Jousset |
| 7,044,991 B2 * | 5/2006 | Wang .............................. 55/366 |
| 7,070,642 B2 | 7/2006 | Scott et al. |
| 7,874,039 B2 * | 1/2011 | Lin ................................. 15/320 |
| 2001/0000845 A1 | 5/2001 | Coulonvaux |
| 2003/0226800 A1 | 12/2003 | Brown et al. |
| 2006/0225389 A1 | 10/2006 | Scott et al. |

FOREIGN PATENT DOCUMENTS

| | | |
|---|---|---|
| WO | WO 99/37386 A1 | 7/1999 |
| WO | WO 2004/039476 A1 | 5/2004 |
| WO | WO 2005/068051 A1 | 7/2005 |

* cited by examiner

FILTER ELEMENT ARRANGEMENT AND PORTABLE AIR CLEANER INCORPORATING SAME

CROSS-REFERENCE TO RELATED PATENT APPLICATIONS

This patent application is the National Stage of International Application No. PCT/US2008/082727, filed Nov. 7, 2008, that claims the benefit of US Provisional Application No. 60/986,744 filed Nov. 9, 2007, the entire teachings and disclosure of which are incorporated herein by reference thereto.

FIELD OF THE INVENTION

This invention generally relates to air cleaners and more particularly relates to air cleaners including a filter element which may be incorporated into a dust collector such as a portable filtration unit for industrial filtration.

BACKGROUND OF THE INVENTION

Pleated filter elements and air cleaner housings are known. The present invention relates to improvements over such designs.

BRIEF SUMMARY OF THE INVENTION

In one aspect, the invention provides an air cleaner assembly, comprising: a particulate collection bin having a top panel defining an opening; a hatch arranged over the opening; a hinge connecting the hatch to the particulate collection bin so that may be pivot about the hinge between open and closed positions; a filter element installed into the opening, the filter element including a ring of filter media and top and bottom end caps mounted to opposed ends of the filter media, the top end cap including an annular flange extending radially outward relative to the ring of filter media and carrying a seal that rests upon and seals against the top panel around the opening.

In yet another aspect, the invention provides: a filter element for use with a filter housing having a hatch and a particulate collection bin, the particulate collection bin having a top panel with a circular opening, the filter element including: a ring of pleated filter media with between about 1 and 6 inches pleat depth, between 100 and 1,000 square feet of media surface area, having an outer diameter of between 10 and 30 inches; a closed bottom end cap sealingly connected to a bottom end of the ring of pleated filter media; a top end cap sealingly connected to a top end of the ring of pleated filter media, the top end cap having an outer annular wall surrounding a periphery of the ring of pleated media and an annular flange projecting radially outward therefrom, the outer annular wall being sized just smaller than the circular opening and the flange extending to a periphery larger than the circular opening, the flange carrying an annular seal extending at least along a bottom side of the flange, wherein the top end cap provides means for supporting the filter element in the particulate collection bin so that only the top end cap and the seal contact the particulate collection bin when the filter element is mounted to the housing; and wherein the filter element weighs between 20 and 120 lbs.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
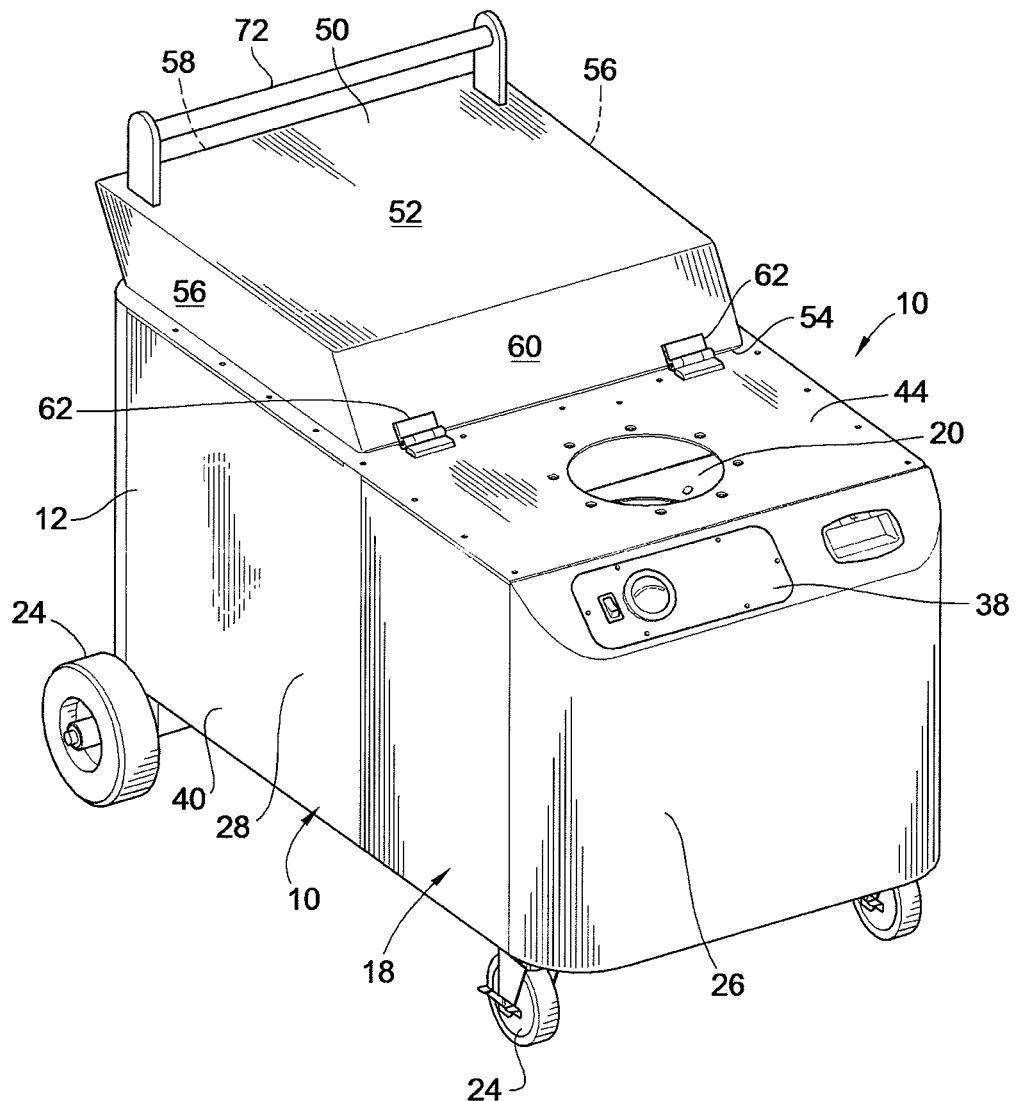
FIG. 1 is an isometric view of a portable air cleaner assembly in accordance with an embodiment of the present invention.
Figure 2:
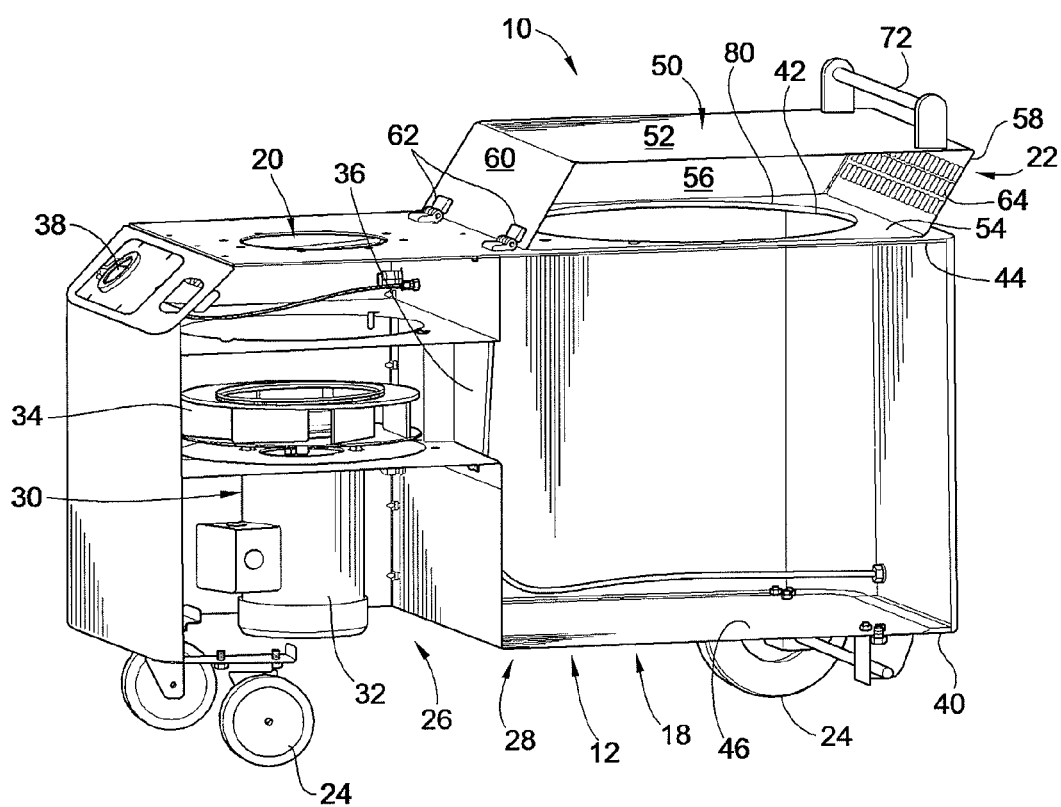
FIG. 2 is a different isometric view of the portable air cleaner assembly of FIG. 1 with the air cleaner assembly being shown in partial cross sectional view (with the filter element not installed)

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As shown in the figures, a preferred embodiment of the present invention takes the form of an air cleaner assembly 10 including generally a filter housing 12 and a replaceable and disposable filter element 14 contained within the housing 12. The air cleaner assembly is designed to be used in connection as a portable unit and/or as a localized wall unit as a dust collector for localized filtration of filter particulates from an air stream. As such, typically only one filter element 14 is provided for the overall air cleaner assembly 10. For example, the air cleaner assembly 10 may be used as an industrial dust collector for filtration of particulates from localized industrial areas where production of such particulates are generated such as welding operations. As such, many of these air cleaner assemblies 10 can be located at strategic locations throughout a manufacturing plant without having ductwork to an external environment. Instead, these air cleaner assemblies 10 are designed to filter the air locally and return the clean air to the same environment.

The filter housing 12 generally includes a dust collection bin 18 and an access hatch 50. The filter housing 12 has an air inlet 20 (which may connect to an intake duct) for receipt of a particulate laden air stream and an air outlet 22 for communicating the filtered clean air stream back into the localized environment. As shown, the air cleaner assembly 10 and the dust collection bin 18 is in the form of a portable unit that may be readily pushed around on wheels 24 and thereby moved from place to place within a manufacturing facility where local filtration may be desired.

The dust collection bin 18 generally includes two different regions including an air intake region 26 and a dust collection region 28. The air intake region 26 generally includes a blower 30 including an electrical motor 32 and a impeller 34 that is operative to draw the air in through the air inlet 20 and blow the air inlet stream in through an internal port 36 into the dust collection region 28. A control panel 38 may be provided to facilitate selective operation of the blower 30 and thereby the air cleaner assembly 10.

The dust collection region 28 generally includes a box-like housing structure which is generally enclosed except for the internal port 36 to receive the inlet air stream and a circular opening 42 provided vertically through a top panel 44. A trap door 46 may also be provided at the bottom end which can be manually closed and opened to collect and empty any dust cake which may have fallen off of the filter element 14 during operation. The filter element 14 is received through the circular opening 42 and rests and is supported upon the top panel 44.

Figure 3:
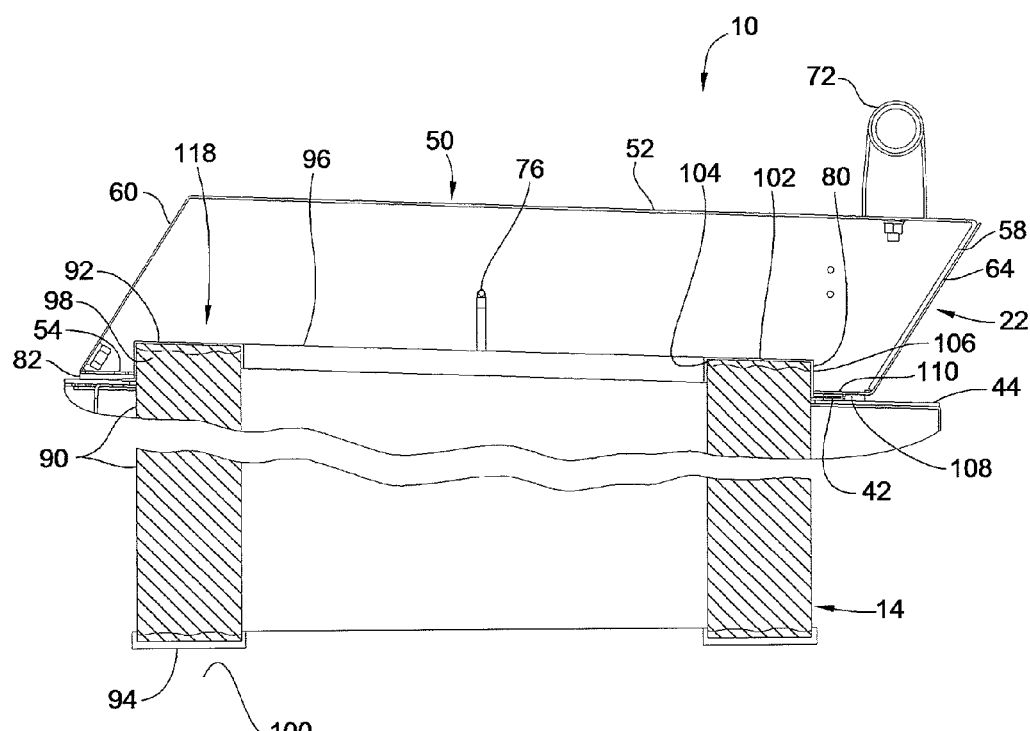
FIG. 3 is a cross sectional view of the hatch, top panel of the collection bin and the filter element engaged therewith (break lines cutting through the filter element)
Figure 4:
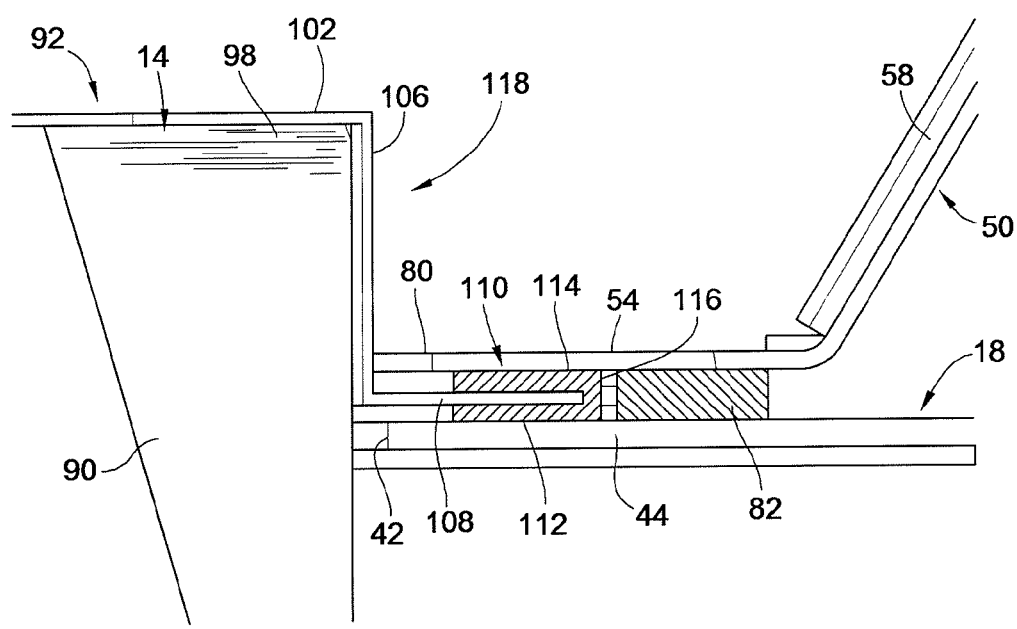
FIG. 4 is an enlarged view of a portion of FIG. 3 to better illustrate the sealing engagement between the filter element, the top panel of the dust collection bin and the access hatch.
Figure 5:
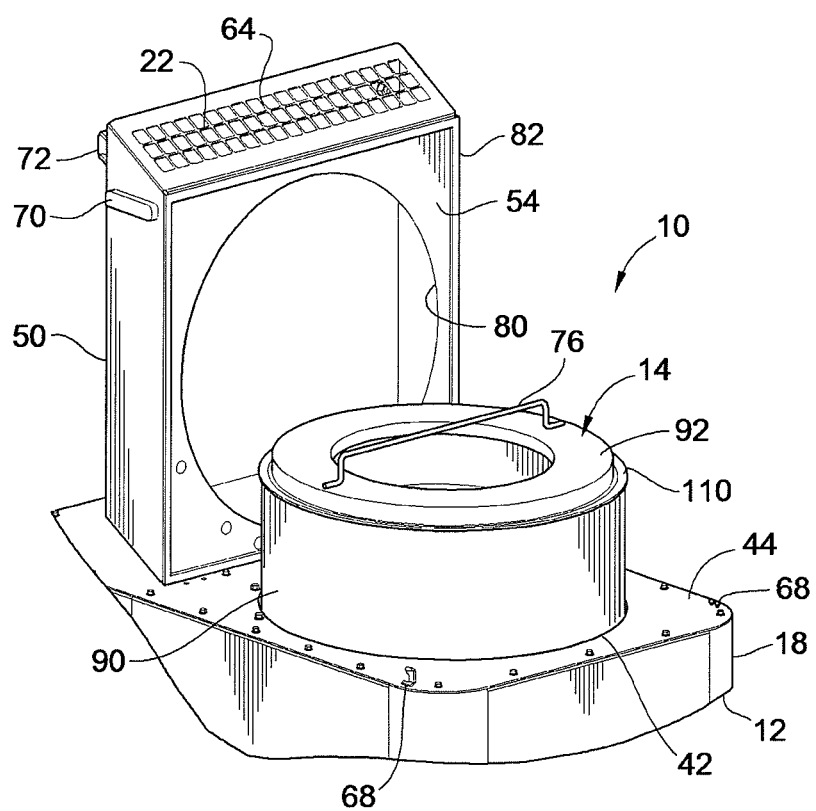
FIG. 5 is an isometric view of a portion of the portable air cleaner assembly with the access hatch open and the filter element partially lifted out of the central opening of the dust collection bin.
Figure 6:
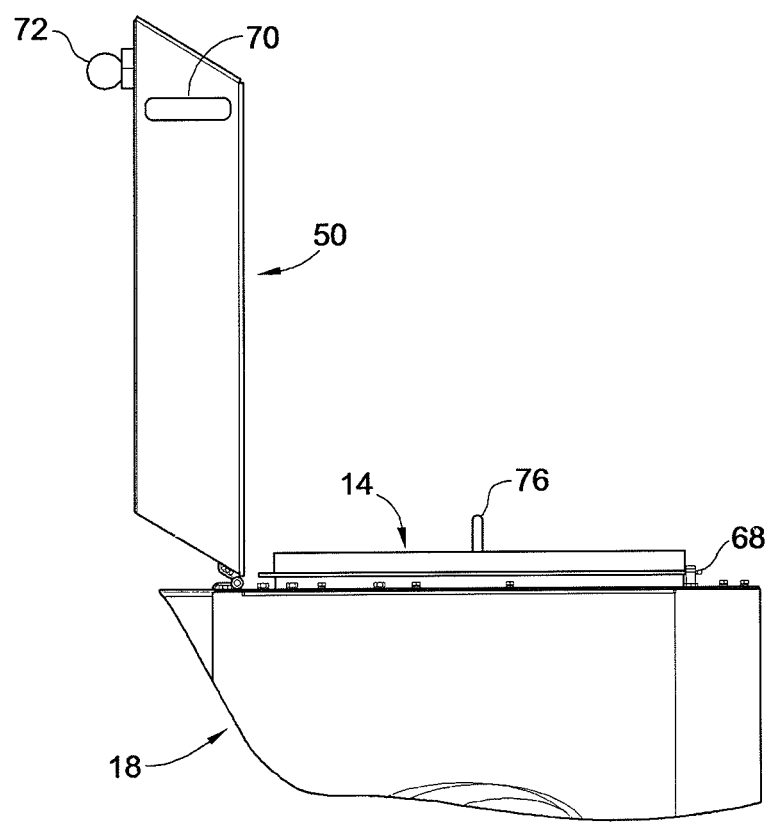
FIG. 6 is a side view of a portion of the portable air cleaner assembly with the access hatch lifted open and the filter element partially lifted.
Figure 7:
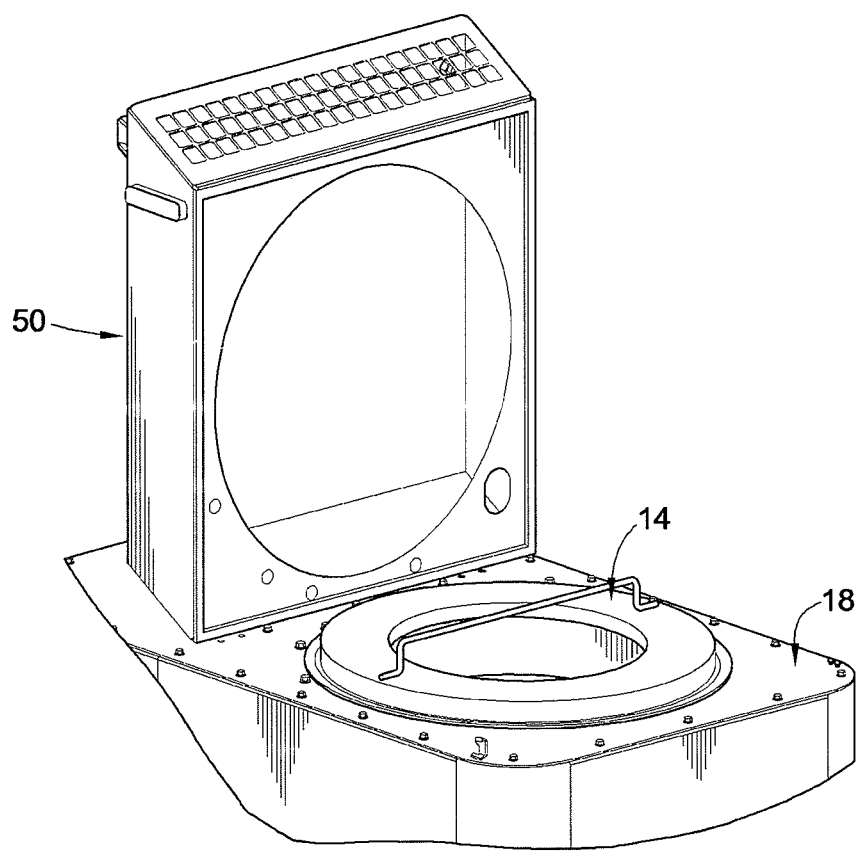
FIG. 7 is an isometric view of the portable air cleaner assembly similar to FIG. 5 except that the filter element 14 is resting and supported upon the top panel of the dust collection bin.

To secure the filter element 14 is in place and ensure appropriate sealing, an access hatch 50 is provided that covers and engages the top end of the filter element 14. The hatch 50 is also used to direct the air stream once it is passed through the filter and directs it out through a selected side of the portable air cleaner assembly. Preferably, the walls of the dust collection bin and the walls of the hatch 50 are made from sheet metal material which is formed and secured together as illustrated. As shown, the hatch includes a generally box-like structure and more particularly as shown in cross section takes the form of a parallelogram to include a top panel 52, a bottom panel 54 generally parallel with the top panel to parallel side panels 56 that are also arranged generally perpendicular to the top and bottom panels, and two front and back end panels 58 and 60. The panels may be separately formed or as shown multiple panels may be formed from a common sheet of sheet steel and simply bent at corners to provide the different panels. The front and back end panels 58, 60 may be generally parallel and preferably as shown are set at oblique angles relative to the top and bottom panels 52, 54. A pair of hinges 62 secure the back end panel 60 to the top panel 44 of the dust collection bin. The hinges 62 permit rotation and pivoting movement of the hatch 50 at least and preferably just greater than 90° between a closed position as illustrated in FIGS. 1-4 and an open position as shown in FIGS. 5-7. As shown best in FIG. 2, the front end panel 58 includes a perforated region 64 to provide for the air outlet which returns filtered clean air back to the localized environment.

To maintain the hatch 50 in a closed and engaged position and to provide a positive axial squeeze force upon the top end of the filter element 14 to provide a positive axial sealing force, a latching mechanism is provided. Specifically, the latching mechanism includes draw latch clasps 68 and draw latches 70 arranged on opposed sides. Preferably and as shown, the draw latches 70 are arranged on the opposed side panels 56 and the latch clasps 68 are mounted to the top panel 44 of the dust collection bin. The draw latches 70 include a spring or other resilient device that facilitates tightening and a positive force when in a clamped position with the latch clasps 68. A handle 72 may optionally be mounted to the top panel 52 of the hatch 50 to facilitate opening and closure of the access hatch 50 manually by a technician.

The hatch and latching arrangement is advantageous in that it allows for simple and quick accessing of the filter when necessary whether it be for removal and replacement of a filter element or whether it be for inspection and/or quick access for receiving a compressed air line which may be manually received within the filter element and blown while the blower unit 30 is off so that compressed air applied from the clean slide can dislodge the collected dust cake from the filter surface on the other side of the filter element. This may temporarily extend filter life. Additionally, the weight of the filter element 14 is sufficient to maintain the axial seal in such instance while the hatch 50 is opened as the full weight of the filter element 14 bears down upon the seal to provide a sealing force.

To facilitate access, the draw latches 70 on either side of the hatch 50 are released and the hatch 50 is pivoted over 90° to insure that the path to remove the filter element is clear. Once the hatch is opened the user can grab the filter element 14 such as by way of a filter element handle 76 that is integrally provided or alternatively attached to the top end cap of the filter element 14 so that the user can pull the filter from the filter device. The user is never required to touch the filter surface where harmful dust may have accumulated during usage. After the filter element 14 has been removed, a replacement filter can be quickly inserted back through the top panel 20. Once the sealing hatch has been engaged, the unit is ready for continued normal operation.

To accommodate the top end of the filter element 14, the bottom panel 54 includes a circular opening 80 that is concentric relative to the circular opening 42 formed in the top panel 44 of the dust collection bin 18. The top end of the filter element 14 is received and projects up through the circular opening 80 in the hatch as illustrated. Preferably, the bottom panel 54 also includes a rectangular gasket 82 that serves to cushion the impact as the access hatch 50 is opened and closed. The rectangular gasket 82 can be made from suitable elastomeric material.

Turning in further detail to the filter element 14, the filter element generally includes a cylindrical ring of filter media 90 and top and bottom end caps 92, 94. The top end cap features a filter element handle 76 to facilitate easy removal and installation. Preferably, the filter element also utilizes a protective cage such as an expanded metal wrapper around the perimeter of the ring of filter media 90 and extending between the top and bottom end caps 92, 94 to prevent damage to the filter element when it is being inserted or removed from the filter device. Typically, the opposed axial edges of the cage will be potted in the end caps.

Because such portable air cleaner assemblies 10 are utilized quite heavily, it is desirable that the filter element can be readily manipulated manually. However the filter element 14 needs to provide sufficient filtration capacity given the heavy industrial usage and to minimize down time for filter maintenance intervals. Accordingly, typically, the filter element will be between 1 and 4 feet tall; between 20 and 120 pounds (more typically between 45 and 80 lbs); and a diameter of between about 10 and 30 inches. For example, filter element with a 20 inch diameter and weighing about 60 pounds with 480 square feet of media that is pleated with a 3 inch pleat depth is one example. Pleat depth will typically be in the range of between 2 and 4 inches and the amount of media would typically be between 200 and 1,000 square feet of media. A suitable filter media comprises a pleated filter paper media, which may also be a composite media to include a high efficiency fine fiber layer that is laid down upon one of the faces of the filtration media.

Considering that there is some sizable weight due to the heavy filtration needs, suitable mounting structure is provided. In accordance with an aspect of the present invention, the present embodiment provides this through the provision of the top end cap 92. As can be seen, the top end cap has a central opening that provides a clean air outlet port 96 therethrough. Further, the top end cap 92 also supports the entire weight of the overall filter element 14 as it rests upon the dust collection bin 18. Accordingly, the top end cap provides a sole support structure for carrying the entire weight and load of the overall filter element 14. To facilitate this, the top end cap 92 is adequately bonded to the top end of the filter media such as through suitable adhesive such as which may be contained within an annular well region 98 defined by the top end cap 92 plastisol (or alternatively an end cap can be directly embedded in the material of the end cap such as may be the case with a plastic molded end cap embodiment). Similarly, the bottom end cap 94 may also include a well region 100, for receiving suitable adhesive for bonding and closing off the bottom end of the filter media 90. As illustrated, the bottom end cap 94 is closed to prevent fluid flow through the bottom end cap. Each of the end caps 92, 94 are sealingly attached to the top and bottom ends of the filter media 90, to prevent short circuiting of unfiltered air past the filter media. Referring in greater detail to the top end cap 92, this structure includes as best shown in FIGS. 3 and 4, a disc portion 102 with an inner annular wall 104 and an outer annular wall 106 integral therewith. Projecting radially outward from the outer annular wall is an annular flange 108 that is integral with the annular wall 106 and in surrounding relation thereto. A circular gasket 110 is fitted or molded onto this annular flange 108 and provides an axial sealing portion 112 along the bottom side that sealingly engages along a circular interface with the top panel 44 of the dust collection bin 18. Considering frequent change intervals, the gasket is carried and provided by the filter element, so as to prevent fatigue in the seal in the event it was only provided on the housing. Preferably, the circular gasket 110 also includes an engagement and cushion portion 114 along the top side of the annular flange 108 which engages with the bottom panel 54 of the access hatch 50. Sealing portions 112, 114 are preferably connected by an annular connection portion 116 that circumscribes and covers the outer edge of the annular flange 108. The gasket 110 may be provided as a slitted slip gasket that can be stretched and fitted onto the flange 108 or alternatively may be molded thereon directly.

The top end cap 92 may either be made of metal material or plastic material, or other suitable material. While similar gauges or can be used, for cost efficiency and weight reasons, the top end cap 92 can be and will typically be of a different gauge and a much heavier gauge then the bottom end cap 94, due to the supporting function of the top end cap. The top end cap typically is formed, for example, from sufficiently heavy gauge metal material or as a plastic molded component. In either event, it is sufficient to carry moment loads that occur and/or are carried through the annular flange 106 and the outer annular wall 106, without any substantial bending of these regions that would affect sealing function (e.g. a seal can be provided simply by the weight of the filter element such as when the access hatch is open). As can be seen, the filter element 14 is situated upright with a top end 118 projecting through the openings 42 and 80 in the dust collection bin 118 and access hatch 50.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air cleaner assembly, comprising:
a particulate collection bin having a top panel defining an opening;
a hatch arranged over the opening;
a hinge connecting the hatch to the particulate collection bin so that may be pivot about the hinge between open and closed positions;
a filter element installed into the opening, the filter element including a ring of filter media and top and bottom end caps mounted to opposed ends of the filter media, the top end cap including an annular flange extending radially outward relative to the ring of filter media and carrying a seal that rests upon and seals against the top panel around the opening;
wherein the hatch positively engages the top end of the filter element to squeeze the seal.

2. The air cleaner assembly of claim 1, wherein the hatch includes a top wall and a bottom wall in spaced relation and a sidewall extending therebetween and connected the top and bottom walls, the bottom wall defining a second opening, a top end of the filter element projecting up through the second opening when the hatch is in the closed position.

3. An air cleaner assembly, comprising:
a particulate collection bin having a top panel defining an opening;
a hatch arranged over the opening;
a hinge connecting the hatch to the particulate collection bin so that may be pivot about he hinge between open and closed positions;
a filter element installed into the opening, the filter element including a ring of filter media and top and bottom end caps mounted to opposed ends of the filter media, the top end cap including an annular flange extending radially outward relative to the ring of filter media and carrying a seal that rests upon and seals against the top panel around the opening wherein the seal extends around the flange to include a first annular portion compressed between the bottom wall and the flange and an annular sealing portion between the flange and the top panel.

4. The air cleaner assembly of claim 3, further comprising a latch mechanism between the hatch and the particulate collection bin in spaced relation to the hinge having a latched position compressing the hatch upon the first annular portion of the seal.

5. The air cleaner assembly of claim 4, wherein the sidewall is at least partially perforated to provide an air outlet.

6. The air cleaner assembly of claim 5, further comprising an air intake region having a blower, the blower arranged to blow unfiltered air into the particulate collection bin, radially inward through the media.

7. The air cleaner assembly of claim 6, wherein the filter element is supported by the top end cap on the particulate collection bin with only the top end cap and the seal contacting the particulate collection bin when the filter element is mounted to the housing.

8. The air cleaner assembly of claim 7, wherein the top and bottom walls of the hatch are generally parallel, wherein the sidewall includes two first panels that are generally parallel and also perpendicular to the top and bottom walls, and two second panels that are parallel relative to each other but oblique relative to the top and bottom panels.

9. The air cleaner assembly of claim 8, wherein the perforated region is through one of the second panels and arranged to direct clean air outlet flow diagonally downward toward a floor surface.

10. The air cleaner assembly of claim 9, wherein the second opening of the hatch is larger than the opening in the top panel and concentrically arranged in the closed position.

11. The air cleaner assembly of claim 9, further comprising a control panel for operating the blower on a side of the air intake region.

12. The air cleaner assembly of claim 11, wherein the air cleaner assembly is portable wherein the particulate collection bin is mounted upon wheels.

13. A replacement filter element configured for use with the air cleaner assembly of claim 1.

14. A filter element for use with an air cleaner having a hatch and a particulate collection bin, the particulate collection bin having a top panel with a circular opening, the filter element including:

a ring of pleated filter media with between about 1 and 6 inches pleat depth, between 100 and 1,000 square feet of media surface area, having an outer diameter of between 10 and 30 inches;

a closed bottom end cap sealingly connected to a bottom end of the ring of pleated filter media;

a top end cap sealingly affixed in a non-removable manner to a top end of the ring of pleated filter media, the top end cap having an outer annular wall surrounding a periphery of the ring of pleated media and an annular flange projecting radially outward therefrom, the outer annular wall being sized just smaller than the circular opening and the flange extending to a periphery larger than the circular opening, the flange carrying an annular seal extending at least along a bottom side of the flange, wherein the top end cap provides means for supporting the filter element in the particulate collection bin so that only the top end cap and the seal contact the particulate collection bin when the filter element is mounted to the housing, and wherein the filter element weighs between 20 and 120 lbs.

15. The filter element of claim 14, wherein the top end cap is of a different gauge thickness and strength than the bottom end cap.

16. The filter element of claim 14, wherein the annular seal is a slip gasket extending around the flange to cover top and bottom sides of the flange.

17. The filter element of claim 14, further comprising a cage in surrounding relation of the filter media.

18. The filter element of claim 14, wherein the end caps define annular wells with adhesive material therein bonding the end caps to opposing ends of the pleated filter media.

19. The filter element of claim 14, wherein the filter element weighs between 45 and 90 lbs, has a pleat depth of between 2 and 4 inches, and between 300 and 600 square feet of media surface area and a diameter of between 15 and 25 inches.

20. The filter element of claim 14, further including a handle on the top end cap traversing an outlet port formed in the top end cap.

* * * * *